United States Patent [19]

Bates et al.

[11] Patent Number: 5,212,864
[45] Date of Patent: May 25, 1993

[54] NOZZLE RESTRICTOR ASSEMBLY AND METHOD OF INSTALLING SAME

[75] Inventors: Dale Bates, Columbus; Daniel N. Smith, North Vernon; Richard F. Little, Columbus, all of Ind.

[73] Assignee: Arvin Industries, Inc., Columbus, Ind.

[21] Appl. No.: 754,531

[22] Filed: Sep. 4, 1991

[51] Int. Cl.⁵ ............................................... B67C 3/34
[52] U.S. Cl. .................................... 29/434; 29/436; 29/450; 29/458; 29/460; 29/527.2
[58] Field of Search ............ 29/434, 436, 401.1, 29/890.12, 890.124, 458, 460, 450, 527.2, 527.4, 451; 141/312; 220/86.1, 86.2, 746, 747, 748, 749, 750

[56] References Cited

U.S. PATENT DOCUMENTS

| | | | |
|---|---|---|---|
| 4,248,279 | 2/1981 | Warmbold | 220/86.2 |
| 4,733,791 | 3/1988 | Sinclair | 220/86.2 |

Primary Examiner—Joseph M. Gorski
Attorney, Agent, or Firm—Barnes & Thornburg

[57] ABSTRACT

A method is provided for installing a nozzle restrictor assembly in a fuel filler tube. The method comprises the steps of attaching a restrictor plate to an inner surface of the fuel filler tube, coating the restrictor plate and the fuel filler tube, and inserting a closure plate through a first slot formed in the restrictor plate so that the closure plate is positioned to block the opening. A nozzle restrictor assembly is also provided which comprises a restrictor plate sized for insertion into a fuel filler tube and a mechanism for selectively closing an opening formed in the restrictor plate upon withdrawal of a fuel filler nozzle.

29 Claims, 4 Drawing Sheets

NOZZLE RESTRICTOR ASSEMBLY AND METHOD OF INSTALLING SAME

BACKGROUND AND SUMMARY OF THE INVENTION

The present invention relates to a nozzle restrictor assembly for a fuel filler tube of a vehicle or the like and a method for installing a nozzle restrictor assembly in a fuel filler tube. More particularly, the present invention relates to a restrictor assembly designed to simplify the manufacturing process for fuel filler tubes, particularly with respect to protective coating operations.

Vehicle fuel filler tubes typically include nozzle restrictor assemblies at or near the inlet end thereof. The restrictor assemblies are designed to prevent passage of large diameter fuel filler nozzles into the fuel filler tube. Many consumers accustomed to pumping gasoline at a self service filling station have noticed that large diameter nozzles are always provided on pumps that dispense leaded fuel while small diameter nozzles are always provided on pumps that dispense unleaded fuel.

A restrictor assembly is designed so that fuel filler nozzles dispensing leaded fuel have a nozzle diameter too large to pass through the nozzle-receiving aperture that is formed in the restrictor assembly, thus compelling a user to switch to a small diameter nozzle on an unleaded fuel pump and follow requirements to use unleaded fuel. Such a restrictor assembly typically includes a threaded cup mounted in the filler neck and formed to include a small diameter opening for receiving the small diameter fuel filler nozzle and a spring deflector for normally covering the opening.

In current manufacturing processes for fuel filler tubes, the filler tube is coated with a protective coating prior to the installation of the restrictor assembly. The various components of the restrictor assembly must be assembled off-line and coated separately of the fuel filler tube. The pre-coated restrictor assembly is then pressed into the pre-coated fuel filler tube.

Generally, the fuel cap, when installed on the fuel filler tube, provides a barrier to fuel vapor leakage. However, for restrictor assemblies using a threaded cup, the fuel cap is threaded into the threaded cup and does not seal the joint between the threaded cup and the inner wall of the fuel filler tube. Accordingly, the joint between the restrictor assembly and the filler neck must be carefully sealed during an extra sealing operation to prevent leakage of fuel vapor through the joint between the pre-coated restrictor assembly and the inner wall of the pre-coated fuel filler tube.

The type of extra sealing operation employed to seal conventional restrictor assemblies is dependent upon the type of protective coating which has been applied to the restrictor assembly and the fuel filler tube. Where the protective coating is a lead/tin dip coating or the like, sealing is accomplished by soldering the restrictor assembly to the fuel filler tube. Where the protective coating is paint, sealing is accomplished by the use of O-rings or adhesives. In either case, minor imperfections in the sealing medium or its method of application can cause unacceptable fuel vapor leakage through the joint between the conventional restrictor assembly and the fuel filler tube.

According to the present invention, a method is provided for installing a restrictor assembly in a fuel filler tube. The method comprises the steps of providing a restrictor plate formed to include an opening allowing passage of a fuel filler nozzle therethrough and a slot, attaching the restrictor plate to an inner wall of the fuel filler tube, coating the restrictor plate and the fuel filler tube, and inserting a closure plate through the slot to block the opening and provide a restrictor assembly inside the fuel filler tube.

Preferably, the coating step is performed before the inserting step. Using this method, the fuel filler tube and the restrictor plate are coated in a single step to seal any joint between the tube and plate after the restrictor plate has been attached to the inner wall of the fuel filler tube. Advantageously, all moving parts of the restrictor assembly (such as the closure plate) are mounted on the restrictor plate after the restrictor plate and the fuel filler tube have been properly coated.

In preferred embodiments, one portion of the closure member is inserted through the slot formed in the restrictor plate and another portion of the closure plate is pivoted to lock into place in engagement with the restrictor plate. Once properly assembled, the closure plate bears against a side of the restrictor plate facing away from the user and toward the vehicle fuel tank to cover the nozzle-receiving opening.

The present invention also provides an apparatus facilitating simplified and efficient assembly as heretofore described. The nozzle restrictor assembly of the present invention includes a restrictor plate formed to include an opening allowing passage of a fuel filler nozzle therethrough and means for selectively closing the opening upon withdrawal of the fuel filler nozzle. The restrictor plate is formed to include a slot and the closing means is sized for insertion through the slot.

Additional objects, features, and advantages of the invention will become apparent to those skilled in the art upon consideration of the following detailed description of preferred embodiments exemplifying the best mode of carrying out the invention as presently perceived by the inventor.

BRIEF DESCRIPTION OF THE DRAWINGS

The detailed description particularly refers to the accompanying figures in which.

DETAILED DESCRIPTION OF THE DRAWINGS

Figure 1:
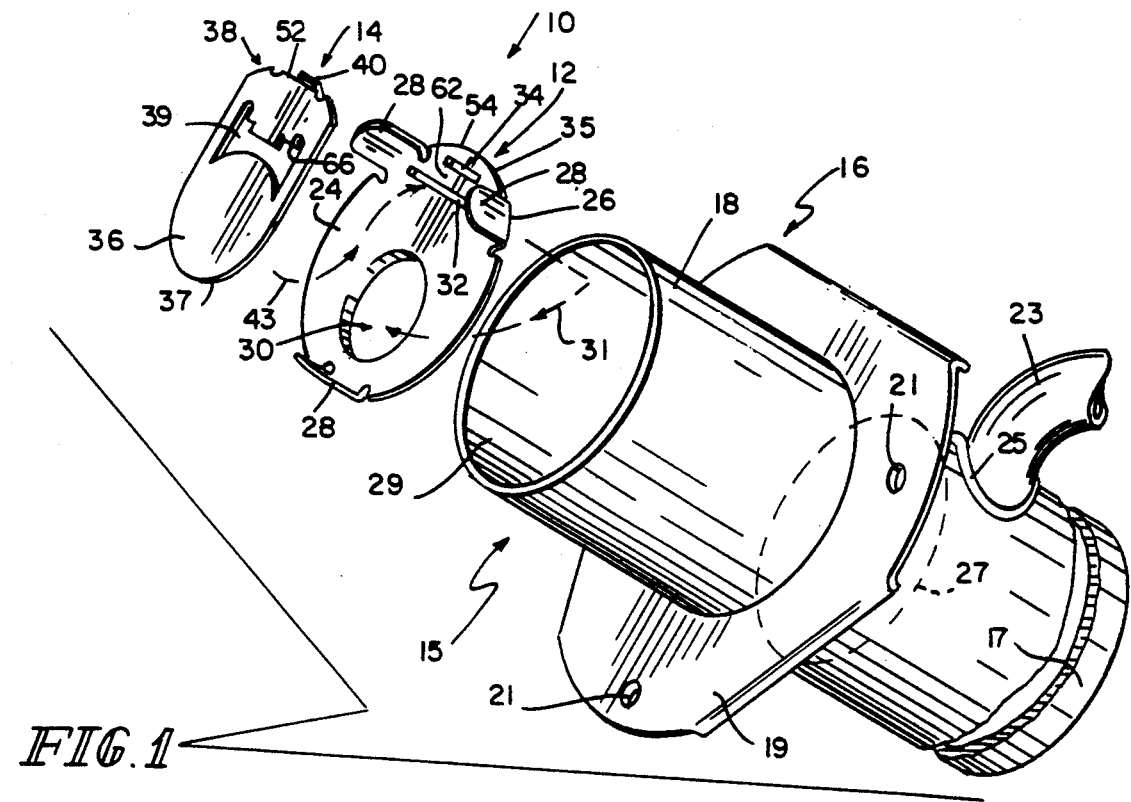
FIG. 1 is an exploded assembly view of a restrict assembly in accordance with the present invention showing an unassembled closure plate, restrictor plate, and a fuel filler in which the restrictor assembly can be installed for use.

A nozzle restrictor assembly for use in accordance with the method of the present invention is illustrated in FIG. 1. As shown, a nozzle restrictor assembly 10 includes a restrictor plate 12 providing a nozzle opening 30 for receiving a properly sized fuel-dispensing nozzle therein and a closure plate 14 serving to normally cover opening 30. Restrictor assembly 10 is configured for mounting in a fuel filler tube 16 and functions to prevent a user from inserting one of the larger diameter nozzles used to dispense leaded fuels into the fuel filler tube 16.

Fuel filler tube 16, shown in fragment in FIG. 1, includes a cylinder 15 having an inner end 17 attached to a vehicle fuel tank 13 and an outer end 18 configured to receive a fuel cap (not shown). Outer end 18 includes a curled-back rim 20 (shown in FIG. 2) which provides a seat for the fuel cap.

Figure 2:
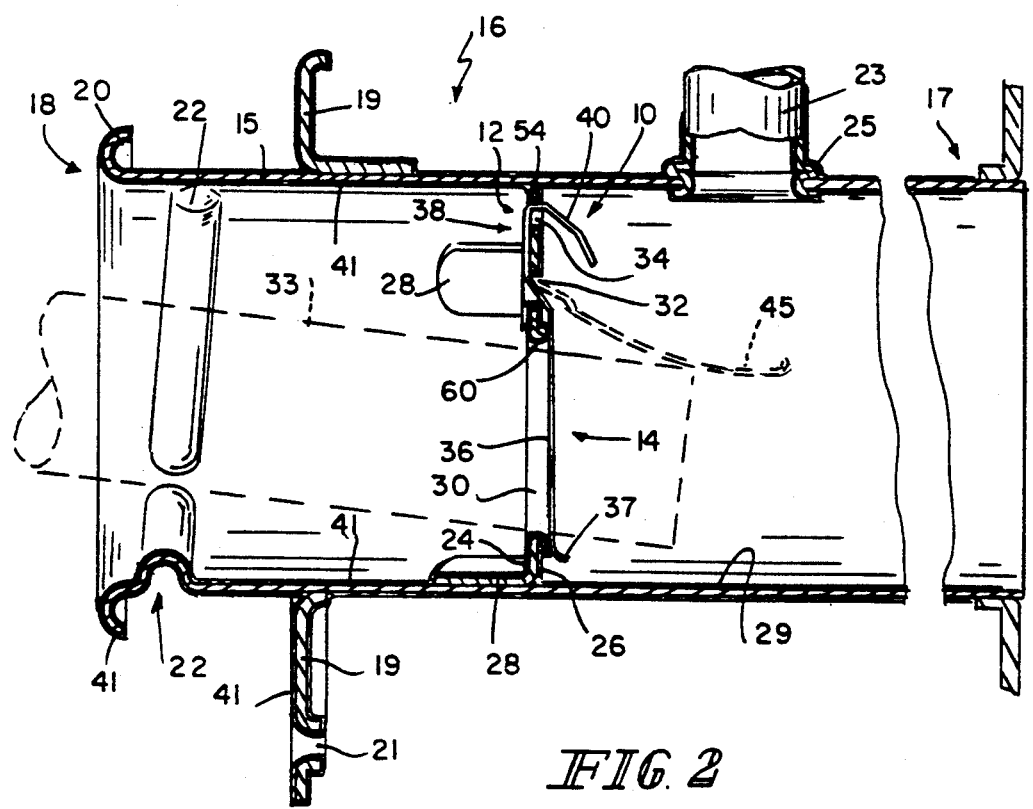
FIG. 2 is a sectional view of a fuel filler tube containing a nozzle restrictor assembly in accordance with the present invention showing the displacement of a portion of the closure plate to an open position (dotted lines) in response to insertion of a fuel filler nozzle and to a closed position (solid lines) in response to withdrawal of the fuel filler nozzle.

Fuel filler tube 16 is also provided with a mounting plate 19 formed to include openings 21 for receiving rivets or other fasteners for mounting fuel filler tube 16 to a vehicle. Fuel filler tube 16 also includes a tube 23 for venting fuel vapor as vehicle fuel tank 13 fills with gasoline. Referring to FIG. 2, tube 23 includes a crimped end 25 for attachment to fuel filler tube 16 at a location inside the region in the cylinder 15 between the fuel tank 13 and the nozzle restrictor assembly 10. Cylinder 15 also includes an inner wall 29 to which nozzle restrictor assembly 10 is attached. A layer of protective coating 41 is applied to fuel filler tube 16 and restrictor plate 12 as will be described.

As shown in FIG. 2, threads 22 are formed directly in cylinder 15 near outlet end 18 after the nozzle restrictor assembly 10 has been mounted inside the fuel filler tube 16. A fuel cap (not shown) provided with appropriate threading can engage threads 22 and seal against rim 20 to substantially prevent the escape of liquid fuel and fuel vapors from fuel filler tube 16 to the atmosphere. Restrictor plate 12 includes a first side 24 facing toward outer end 18 and a second side 26 facing into the filler tube 16 toward fuel tank 13.

Restrictor plate 12 also includes a plurality of upstanding ears 28 spaced about its periphery as shown best in FIG. 1. Although three such ears 28 are shown in the illustrated embodiment, alternative designs are contemplated within the scope of the present invention. Ears 28 provide surfaces for spot welding restrictor plate 12 to inner wall 29 during assembly of restrictor assembly 10 into fuel filler tube 16 as described below. When assembled, restrictor plate 12 occupies the axial position inside cylinder 15 represented by dotted circle 27 in FIG. 1.

Figure 6:
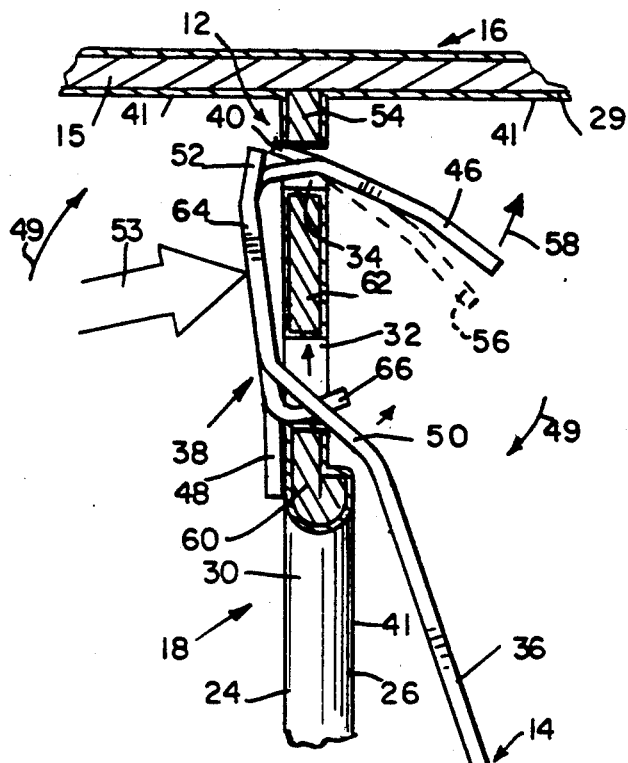
FIG. 6 is a further enlarged view of the restrictor assembly of FIG. 2 showing pivoting movement of a locking portion of the closure plate relative to the fixed restrictor plate to place a locking tab on the closure plate into a locking position engaging the coated nozzle restrictor plate.

As noted, restrictor plate 12 is formed to include nozzle opening 30 for receiving a fuel filler nozzle 33 during refueling. Opening 30 is provided with a diameter selected to admit only unleaded fuel-dispensing nozzles such as nozzle 33 and to block admission of conventional larger diameter leaded fuel-dispensing nozzles (not shown). Opening 30 is normally covered or closed by closure plate 14 at times other than during refueling as shown in FIG. 6, as will be described below.

Figure 4:
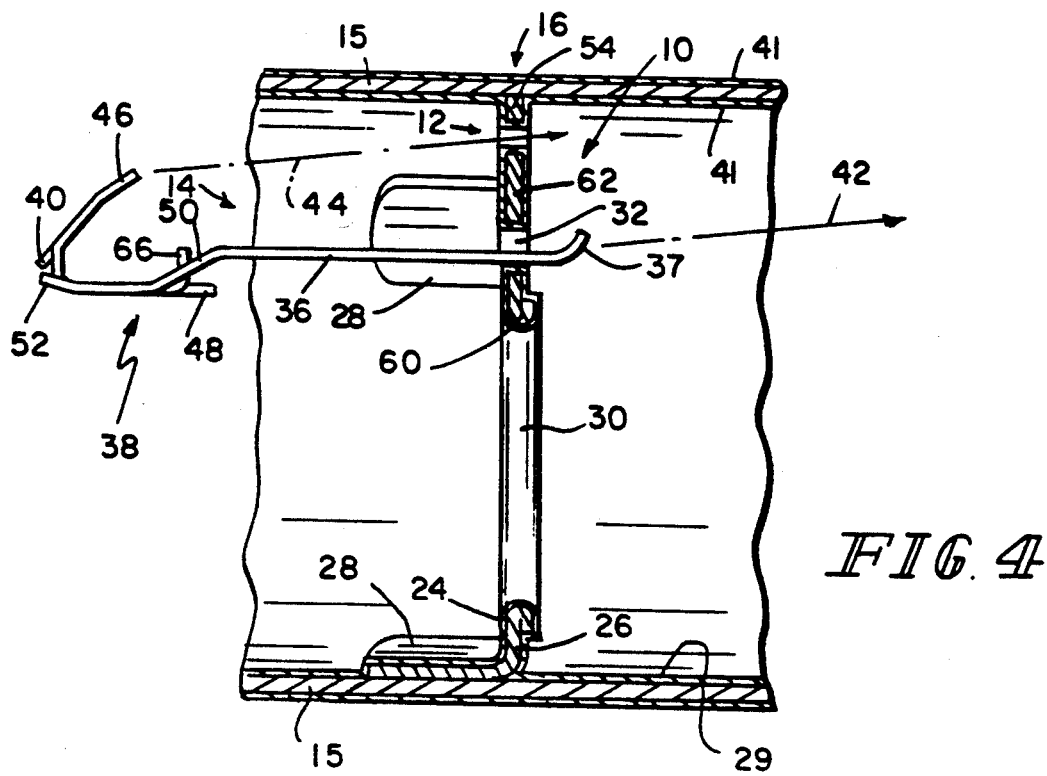
FIG. 4 is a view of the fuel filler tube of FIG. 1 showing the insertion of the closure plate into a slot formed in the coated nozzle restrictor plate during assembly operations in accordance with the method of the present invention.
Figure 5:
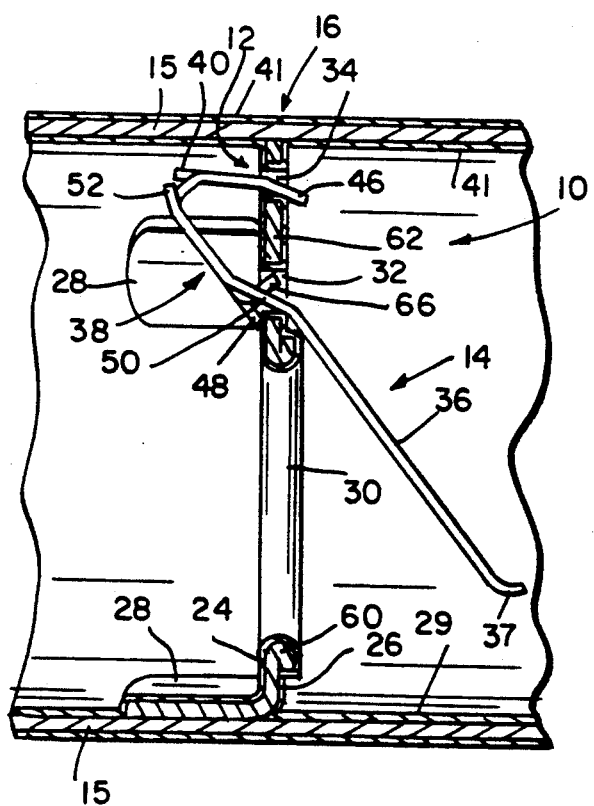
FIG. 5 is a view similar to FIG. 3 showing the insertion of a locking tab on the closure plate into a second slot formed in the coated nozzle restrictor plate in accordance with the method of the present invention.

Restrictor plate 12 also is formed to include a first slot 32 formed to lie adjacent to opening 30 and a second slot 34 formed to lie between first slot 32 and the perimeter edge 35 of the restrictor plate 12. Slots 32 and 34 are sized and positioned to receive portions of closure plate 14 as shown in FIGS. 4-6. As will be subsequently described in greater detail, one portion of closure plate 14 is inserted in slot 32 (as indicated by dotted arrow 43 in FIG. 1) and another portion of closure plate 14 is pivoted (as indicated by dotted arrow 31) to close nozzle opening 30.

Closure plate 14 is preferably fashioned of resilient stainless steel or other spring material and includes a closure portion 36, a hinge or spring portion 50, and a locking portion 38. Closure plate 14 is advantageously sized for insertion through first slot 32 is so that closure portion 36 bears against the inner side 26 of restrictor plate 12 as shown, for example, in solid lines in FIG. 2. When mounted on restrictor plate 12, closure plate 14 serves as a means for closing nozzle opening 30 upon withdrawal of a fuel filler nozzle 33 (shown in dotted lines in FIG. 2), for example, at the completion of refueling.

Figure 7:
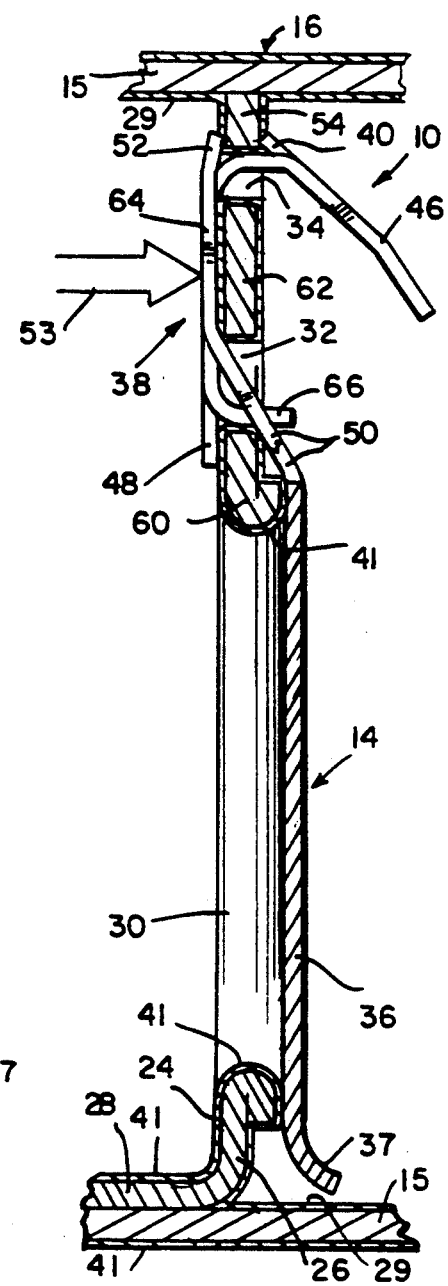
FIG. 7 is a view similar to FIG. 5 yet further enlarged showing the closure plate locked to the coated nozzle restrictor plate with the locking tab bearing against the restrictor plate and the closure portion moved to cover the nozzle-receiving opening formed in the restrictor plate.

Closure portion 36 of closure plate 14 normally covers nozzle opening 30 as shown best in FIG. 2 and FIG. 7. Closure portion 36 has a curved distal end 37.

Locking portion 38, as shown, for example, in FIGS. 4-7, includes a locking tab 40 having a bent distal end 46. Locking tab is advantageously sized for insertion through second slot 34. Locking portion 38 also includes a depending tab 48, an upstanding tab 52, and a support tab 66 extending generally perpendicular to depending tab 48. When closure plate 14 is coupled to restrictor plate 12, locking tab 40 bears against side 26 of restrictor plate 12 and tabs 48, 52 bear against side 24 of restrictor plate 12. Locking tab 40 cooperates with upstanding tab 52 to grip a radially outer portion 54 of restrictor plate 12 as shown in FIG. 7. Outer portion 54 is located between second slot 34 and the perimeter edge 35 of plate 12. Thus, locking tab 40 provides means for coupling closure portion 36 to restrictor plate 12 so that closure portion 36 is deflectable relative to restrictor plate 12 to move away from nozzle opening 30 during refueling upon insertion of a fuel filler nozzle Specifically, closure plate 14 bends to occupy a deflected position 35 (shown in dotted lines in FIG. 2) but is movable to close nozzle opening 30 upon withdrawal of fuel filler nozzle 33.

Spring portion 50, shown best in FIGS. 5-7, allows displacement of closure portion 36 away from nozzle opening 30 upon insertion of a small diameter unleaded fuel filler nozzle 33 into nozzle opening 30. Spring portion 50 connects locking portion 38 and closure portion 36 and extends through slot 32 when closure plate 14 is coupled to restrictor plate 12 as shown best in FIGS. 6-7.

A method for mounting restrictor assembly 10 in a fuel filler tube 16 in accordance with the present invention is illustrated in FIGS. 3-6. First, restrictor plate 12 is attached to inner surface 29 of cylinder 15. Specifically, ears 28 at the outside edge 35 of restrictor plate 12 are spot welded to inner surface 29 of the fuel filler tube 16 so that the outer surface 24 of restrictor plate 12 lies approximately 1.5 inches (3.8 cm) from outer end 18. Thus, advantageously, the joints where ears 28 attach to inner wall 29 are not exposed to the atmosphere when the fuel cap (not shown) is attached to the outer end 18, but rather lie well within fuel filler tube 16. Any fuel vapor leaking through such joints during operation of the vehicle with the fuel cap installed on fuel filler tube 16 (or passing through openings in restrictor plate 12) will be trapped by the fuel cap, because the fuel cap is threaded directly into sealed engagement with threads 22 on inner wall 29 of fuel filler tube 16.

After restrictor plate 12 has been attached to cylinder 15, threads 22 are crimp-formed in cylinder 15 at outer end 18 using a hydraulic thread-sizing machine to perform a three-segment threading technique. In addition, curled-back rim 20 is formed at end 18 using a press operation to provide a flat sealing surface for a fuel cap (not shown).

Figure 3:
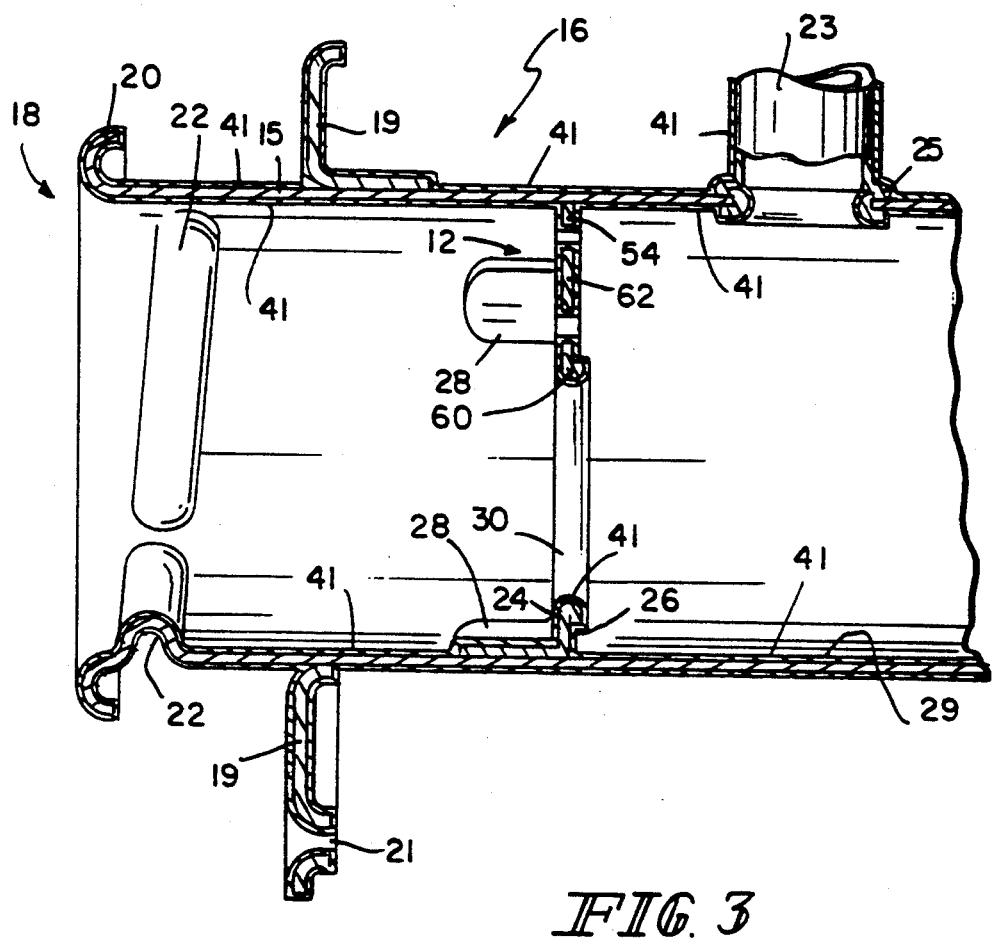
FIG. 3 is an enlarged sectional view of the fuel filler tube of FIG. 1 showing a layer of coating applied to the nozzle plate and the fuel filler tube.

Following the thread-forming step, tube 16 and the restrictor plate 12 mounted therein are dip-coated with a protective coating 41 as shown in FIG. 3 to inhibit development of rust on the tube 16 and nozzle restrictor plate 12. The thickness of the coating 41 in FIG. 3 is illustrative only. It will be appreciated by those of ordinary skill in the art that coating 41 is a very thin layer as is typically achieved through a standard dip-coating process. A variety of coatings may be used, including paint, zinc, or a lead/tin coating. Advantageously, tube 16 is dipped into the coating bath after restrictor plate 12 has been attached to fuel filler tube 16 so that the restrictor plate 12 and fuel filler tube 16 are coated in a single step.

Advantageously, closure plate 14 can be inserted through first slot 32 after restrictor plate 12 has been mounted in fuel filler tube 16 and coated with coating 41. The insertion sequence is illustrated in FIGS. 4-7. As shown in FIG. 4, the relatively long closure portion 36 is first inserted through first slot 32, proceeding from outer side 24 of plate 12 into fuel filler tube 16 in the direction indicated by arrow 42 from left to right in FIG. 4. This inward movement of closure plate 14 ultimately causes bent distal end 46 to move in the direction indicated by arrow 44 as shown in FIG. 4 and enter the second slot 34 as shown in FIG. 5.

Depending tab 48 moves to engage an inner segment 60 of the outer side 24 of plate 12 when the full extent of closure portion 36 has been inserted through slot 32 as shown in FIG. 5. Closure plate 14 will begin to pivot relative to the fixed restrictor plate 12 in direction 49 as shown in FIG. 6, with depending tab 48 serving as a pivot point. Such pivoting movement in direction 49 is a result of applying a force represented by arrow 53 to the spring portion 38 of spring plate 14 while inner segment of restrictor plate 12 is "nested" in the space between tabs 48, 66.

As rotation in the direction of arrow 49 continues, locking tab 40 moves to engage the radially outer segment of restrictor plate 12 as shown in FIG. 6. Locking tab 40 and bent distal end 46 are biased or cammed from their original position 56 (shown in dotted lines) to the position shown in solid as indicated by arrow 58. The biasing force results from the compression of spring portion 50 and locking tab 40 as they are rotated in respective slots 32 and 34.

When pivoting movement of closure plate 14 relative to restrictor plate 12 is complete, closure plate 14 is placed in its operating position as shown in FIG. 7. As shown, radially outer segment 54 of restrictor plate 12 is trapped between locking tab 40 and upstanding tab 52 of spring plate 14. Inner segment 60 of restrictor plate 12 is trapped between depending tab 48 and spring portion 50 of closure plate 14. Depending tab 48 bears directly against outer side 24 of plate 12. Spring portion 50 extends through first slot 32 and bears against the inner segment 60. A central portion 64 of closure plate 14 bears against a central segment 62 of restrictor plate 12.

Spring portion 50 extends through first slot 32 at an angle. When fuel filler nozzle 33 is inserted through nozzle opening 30, the nozzle 33 pushes closure portion 36 away from opening 30. Spring portion 50 bends to provide a hinge action, allowing closure portion 36 to move away from opening 30, as shown, for example, in FIG. 2 in dotted lines.

Locking tab 40 bears against inner side 26 of restrictor plate 12 as shown in FIG. 7. The combined effects of locking tab 40 bearing against inner side 26 and tabs 48 and 52 bearing against outer side 24 ensure that closure plate 14 will remain attached to restrictor plate 12 even when closure portion 36 is forced away from opening 30 as during refueling.

Figure 8:
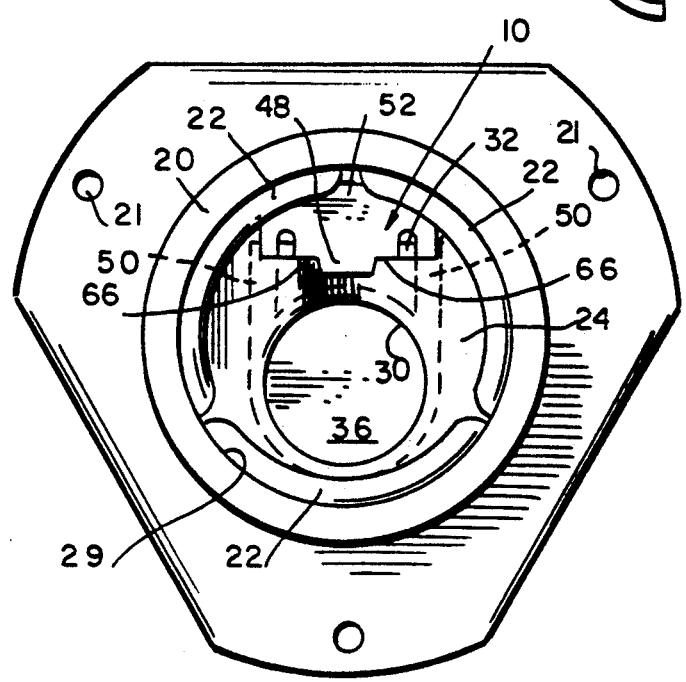
FIG. 8 is a top view of the restrictor assembly installed in a fuel filler tube shown in FIG. 2 as it would appear to a user who has removed the fuel cap from the fuel filler tube.

In FIG. 8, restrictor assembly 10 is shown as it would appear to a user preparing to refuel a fuel tank. Closure plate 14 is shown in its position blocking opening 30.

Although the invention has been described in detail with reference to certain preferred embodiments, variations and modifications exist within the scope and spirit of the invention as described and defined in the following claims.

What is claimed is:

1. A method for installing a restrictor assembly in a fuel filler tube, the fuel filler tube having an inner surface and an open end configured to receive a fuel cap, the restrictor assembly including a restrictor plate and a closure plate having a closure portion, the method comprising the steps of:

attaching the restrictor plate to the inner surface of the fuel filler tube, thereby forming a subassembly, the restrictor plate including an opening allowing passage of a fuel filler nozzle therethrough during refueling, and a first slot sized to receive the closure portion;

coating the subassembly;

inserting the closure portion through the first slot;

positioning the closure portion such that said closure portion blocks the opening; and maintaining the closure portion in this position blocking the opening.

2. The method of claim 1, wherein the coating step is performed before the inserting step.

3. The method of claim 1, further comprising the step of forming threads in the fuel filler tube at the open end, the thread-forming step being performed before the coating step.

4. The method of claim 1, wherein the closure plate includes a spring portion integral with the closure portion, and the maintaining step includes the step of locking the closure plate to the restrictor plate so that the spring portion urges the closure portion to the position blocking the opening upon withdrawal of the fuel filler nozzle from the fuel filler tube.

5. The method of claim 1, wherein the restrictor plate includes a second slot, and further comprising the steps of forming the closure plate to include a locking portion including at least one locking tab and pivoting the closure plate in the first slot, thereby drawing the at least one locking tab through the second slot so that the locking tab engages the restrictor plate.

6. The method of claim 1, wherein the restrictor plate includes a second slot and the closure plate includes a locking portion including at least one locking tab and an upstanding tab lying in spaced-apart relationship with the at least one locking tab, and the positioning step including the step of pivoting the closure plate in the first slot, thereby drawing the at least one locking tab through the second slot and drawing the upstanding tab into engagement with the restrictor plate so that the upstanding tab cooperates with the at least one locking tab and traps a first portion of the restrictor plate therebetween.

7. The method of claim 1, wherein the closure plate includes a locking portion including a depending tab, and the positioning step includes the step of pivoting the closure plate in the first slot, thereby drawing the depending tab into engagement with a second portion of the restrictor plate adjacent the opening.

8. The method of claim 1, wherein the restrictor plate includes a plurality of tangs spaced about its outer periphery and the attaching step includes the step of welding the tangs to the inner wall of the fuel filler tube.

9. The method of claim 1, wherein the restrictor plate includes a second slot, the closure plate includes a locking portion including a locking tab, and the positioning step includes the step of pivoting the closure plate in the first slot, thereby drawing the locking tab through the second slot to bear against the restrictor plate.

10. The method of claim 1, wherein the restrictor plate includes a second slot and the closure plate includes a locking portion including at least one locking tab and an upstanding tab lying in spaced-apart relationship with the at least one locking tab, the positioning step including the step of pivoting the closure plate in the first slot, thereby drawing the at least one locking tab through the second slot and drawing the upstanding tab into engagement with the restrictor plate so that the upstanding tab cooperates with the at least one locking tab and traps a first portion of the restrictor plate therebetween.

11. The method of claim 1, wherein the closure plate includes a locking portion including a depending tab, and the positioning step includes the step of pivoting the closure plate in the first slot, thereby drawing the depending tab into engagement with a second portion of the restrictor plate adjacent the opening.

12. A method for installing a restrictor assembly in a fuel filler tube, the fuel filler tube having an inner surface and an open end configured to receive a fuel cap, the restrictor assembly including a restrictor plate and a closure plate, the method comprising the steps of:
forming the closure plate such that the closure plate includes a spring portion and a closure portion;
attaching the restrictor plate to the inner surface of the fuel filler tube thereby forming a subassembly, the restrictor plate including an opening allowing passage of a fuel filler nozzle therethrough, and a first slot sized to receive the closure portion; and
moving the closure portion through the first slot so that the spring portion biases the closure portion to a position blocking the opening.

13. The method of claim 12, wherein the restrictor plate includes a plurality of tangs spaced about its outer periphery and the attaching step includes the step of welding the tangs to the inner wall of the fuel filler tube.

14. The method of claim 12, wherein the restrictor plate includes a second slot, the closure plate includes a locking portion including a locking tab, and the moving step includes the step of loading the closure plate into the first slot and pivoting the closure plate in the first slot relative to the restrictor plate, thereby drawing the locking tab through the second slot to bear against the restrictor plate.

15. The method of claim 12, wherein the restrictor plate includes a second slot and the closure plate includes a locking portion including at least one locking tab and an upstanding tab lying in spaced-apart relationship with the at least one locking tab, and the moving step includes the step of pivoting the closure plate in the first slot, thereby drawing the at least one locking tab through the second slot and drawing the upstanding tab into engagement with the restrictor plate so that the upstanding tab cooperates with the at least one locking tab and traps a first portion of the restrictor plate therebetween.

16. The method of claim 12, wherein the closure plate includes a locking portion includes a depending tab, and the moving step including the step of pivoting the closure plate in the first slot, thereby drawing the depending tab into engagement with a second portion of the restrictor plate adjacent the opening.

17. The method of claim 12, further comprising the step of coating the subassembly.

18. The method of claim 17, including performing the coating step before the moving step.

19. The method of claim 17, further comprising the step of forming threads in the fuel filler tube at the open end before the coating step.

20. The method of claim 19, wherein the thread-forming step is performed after the attaching step.

21. A method for installing a restrictor assembly in a fuel filler tube, the fuel filler tube having an inner surface and an open end configured to receive a fuel cap, the method comprising the steps of:
attaching a restrictor plate to the inner surface of the fuel filler tube, thereby forming a subassembly, the restrictor plate including an opening allowing passage of a fuel filler nozzle therethrough during refueling, a first slot, and a second slot;
inserting a closure plate through the first slot, the closure plate including a locking tab and an upstanding tab lying in spaced-apart relationship with the locking tab; and
pivoting the closure plate in the first slot, thereby drawing the locking tab through the second slot and drawing the upstanding tab into engagement with a first portion of the restrictor plate, thereby trapping the first portion between the locking tab and the upstanding tab, thus maintaining the closure plate in a position selectively blocking the opening.

22. The method of claim 21, wherein the closure plate includes a depending tab, and the pivoting step includes the step of drawing the depending tab into engagement with a second portion of the restrictor plate adjacent the opening.

23. The method of claim 22, further comprising the steps of forming the closure plate such that the closure plate includes a closure portion blocking the opening and a hinge portion allowing the closure plate to move away from the opening upon insertion of a fuel filler nozzle and trapping the second portion between the depending tab and the hinge portion.

24. The method of claim 21, wherein the restrictor plate includes a plurality of tangs spaced about its outer periphery and the attaching step includes the step of welding the tangs to the inner wall of the fuel filler tube.

25. The method of claim 21, further comprising the step of coating the subassembly.

26. The method of claim 25, wherein the coating step is performed before the inserting and pivoting steps.

27. The method of claim 25, further comprising the step of forming threads in the fuel filler tube at the open end before the coating step.

28. The method of claim 27, including performing the thread-forming step after the attaching step.

29. A method for fabricating a fuel filler assembly, the fuel filler assembly including a fuel filler tube and a restrictor assembly, the fuel filler assembly including a fuel filler tube and a restrictor assembly, the fuel filler tube having an inner surface and an open end, the restrictor assembly including a restrictor plate and a closure plate, the restrictor plate including a first slot, a second slot, and a nozzle opening, the method comprising the steps of:

attaching the restrictor plate to the inner surface, such that the restrictor plate lies inside the fuel filler tube in spaced-apart relation to the open end;

subsequent to the attaching step, forming threads in the fuel filler tube between the open end and the restrictor plate to receive a threaded fuel cap in engagement therewith;

forming the closure plate such that the closure plate includes a closure portion, a spring portion integral with the closure portion and configured to urge the closure portion to a position blocking the nozzle opening upon withdrawal of the fuel filler nozzle from the fuel filler tube, and a locking portion including at least one locking tab; and pivoting the closure plate in the first slot, thereby drawing the at least one locking tab through the second slot so that the at least one locking tab engages the restrictor plate.

* * * * *